(12) United States Patent
Whaley (10) Patent No.: US 10,605,945 B2
(45) Date of Patent: Mar. 31, 2020

(54) SHIELDINGS FOR METAL DETECTOR HEADS AND MANUFACTURING METHODS THEREOF

(71) Applicant: Chemring Sensors and Electronic Systems, Inc., Dulles, VA (US)

(72) Inventor: Brian A. Whaley, Vienna, VA (US)

(*) Notice: Subject to any disclaimer, the term of this patent is extended or adjusted under 35 U.S.C. 154(b) by 0 days.

(21) Appl. No.: 16/042,885

(22) Filed: Jul. 23, 2018

(65) Prior Publication Data

US 2018/0329100 A1 Nov. 15, 2018

Related U.S. Application Data

(62) Division of application No. 14/045,136, filed on Oct. 3, 2013, now Pat. No. 10,031,251.

(60) Provisional application No. 61/709,936, filed on Oct. 4, 2012.

(51) Int. Cl.
  *G01V 3/08* (2006.01)
  *G01V 13/00* (2006.01)
  *G01V 3/10* (2006.01)

(52) U.S. Cl.
  CPC .............. *G01V 3/08* (2013.01); *G01V 3/104* (2013.01); *G01V 13/00* (2013.01); *Y10T 29/4902* (2015.01)

(58) Field of Classification Search
  CPC ........... G01V 3/08; G01V 3/104; G01V 13/00
  See application file for complete search history.

(56) References Cited

U.S. PATENT DOCUMENTS

| | | | |
|---|---|---|---|
| 2,807,777 A | 9/1957 | Doll | |
| 3,662,255 A | 5/1972 | Garrett | |
| 3,940,696 A | 2/1976 | Nagy | |
| 4,053,828 A | 10/1977 | Ambler et al. | |
| 4,255,711 A | 3/1981 | Thompson | |
| 4,451,812 A * | 5/1984 | Vescovi ............... | H05K 9/0039 336/200 |
| 4,862,316 A | 8/1989 | Smith et al. | |
| 5,068,612 A | 11/1991 | Auslander et al. | |
| 5,245,307 A * | 9/1993 | Klaus .................... | G01V 3/107 336/200 |
| 5,680,048 A | 10/1997 | Wollny | |
| 5,889,583 A | 3/1999 | Dunne | |
| 6,026,135 A | 2/2000 | McFee et al. | |
| 6,333,631 B1 | 12/2001 | Das et al. | |
| 6,341,551 B1 | 1/2002 | Comeyne | |
| 6,343,534 B1 | 2/2002 | Khanna et al. | |
| 6,377,872 B1 | 4/2002 | Struckman | |
| 6,396,433 B1 | 5/2002 | Clodfelter | |

(Continued)

FOREIGN PATENT DOCUMENTS

EP 1750147 A1 2/2007

OTHER PUBLICATIONS

Australian Examination Report No. 1 for Standard Patent Application for Application No. 2017272302, dated Nov. 9, 2018, 4 pages.

(Continued)

*Primary Examiner* — Daniel R Miller
(74) *Attorney, Agent, or Firm* — Finnegan, Henderson, Farabow, Garrett & Dunner, LLP (57) ABSTRACT

Systems and methods for shielding a metal detector head include placement of conductive shielding around the coils of the head to reduce the effects of capacitance variation between the coils and their surroundings.

14 Claims, 12 Drawing Sheets

(56) References Cited

U.S. PATENT DOCUMENTS

| | | |
|---|---|---|
| 6,541,966 B1 | 4/2003 | Keene |
| 6,950,054 B1 | 9/2005 | Steinway et al. |
| 6,952,990 B1 | 10/2005 | Clodfelter |
| 6,999,021 B2 | 2/2006 | Taylor, Jr. et al. |
| 7,042,385 B1 | 5/2006 | Wichmann |
| 7,202,661 B2 | 4/2007 | Keene et al. |
| 7,310,060 B2 | 12/2007 | Stilwell et al. |
| 7,333,045 B1 | 2/2008 | Aomori et al. |
| 7,532,127 B2 | 5/2009 | Holman et al. |
| 7,649,492 B2 | 1/2010 | Wilens et al. |
| 7,652,619 B1 | 1/2010 | Hibbard et al. |
| 7,675,454 B2 | 3/2010 | Lavedas et al. |
| 7,683,821 B1 | 3/2010 | Clodfelter |
| 7,692,598 B1 | 4/2010 | Hibbard et al. |
| 7,788,793 B2 | 9/2010 | Wichmann |
| 7,834,801 B2 | 11/2010 | Waite et al. |
| 7,956,794 B2 | 6/2011 | Skultety-Betz et al. |
| 8,140,217 B2 | 3/2012 | Clodfelter |
| 8,174,429 B2 | 5/2012 | Steinway et al. |
| 8,207,885 B2 | 6/2012 | Hibbard et al. |
| 8,310,236 B2 | 11/2012 | Duvoisin, III |
| 8,374,754 B2 | 2/2013 | Clodfelter |
| 2003/0193429 A1 | 10/2003 | Campana et al. |
| 2004/0022046 A1 | 2/2004 | Leerkamp et al. |
| 2006/0284758 A1 | 12/2006 | Stilwell et al. |
| 2007/0260378 A1 | 11/2007 | Clodfelter |
| 2008/0092364 A1 | 4/2008 | Wichmann |
| 2008/0291080 A1 | 11/2008 | Wilens et al. |
| 2009/0037049 A1 | 2/2009 | Clodfelter |
| 2010/0066585 A1 | 3/2010 | Hibbard et al. |
| 2010/0277397 A1 | 11/2010 | Scott |
| 2012/0092206 A1 | 4/2012 | Etebari et al. |
| 2013/0069814 A1 | 3/2013 | Wolfson et al. |
| 2013/0113648 A1 | 5/2013 | Duvoisin et al. |
| 2013/0214966 A1 | 8/2013 | Bandell |
| 2013/0307531 A1 | 11/2013 | Nel |
| 2014/0097381 A1 | 4/2014 | Mork et al. |

OTHER PUBLICATIONS

S.-H. Lee et al. "Beamforming Array for Detecting Buried Land Mines," SPIE Conference on Detection and Remediation Technologies for Mines and Minelike Targets IV (Apr. 1999), SPIE vol. 3710, pp. 1343-1351 (9 pages total).

Kim et al. "The Design and Realization of a Discreetly Loaded Resistive Vee Dipole on a Printed Circuit Board", Proceedings of SPIE, vol. 5089 (Apr. 2003), pp. 818-829 (12 pages total).

W.R. Scott, Jr. et al. "Combined Seismic, Radar, and Induction Sensor for Landmine Detection," Geoscience and Remote Sensing Symposium, 2004. IGARSS 04. Proceedings, pp. 1613-1616 (4 pages total).

W.R. Scott, Jr., "New Cancellation Technique for Electromagnetic Induction Sensors," Detection and Remediation Technologies for Mines and Minelike Targets X, ed. R.S. Harmon et al., Proc. SPIE vol. 5794 (2005), pp. 328-335 (8 pages total).

W.R. Scott, Jr. "Broadband Electromagnetic Induction Sensor for Detecting Buried Landmines," Geoscience and Remote Sensing Symposium, 2007. IGARSS 2007, pp. 22-25 (4 pages total).

E.B. Fails et al. "Performance Comparison of Frequency Domain Quadrupole and Dipole Electromagnetic Induction Sensors in a Landmine Detection Application," Detection and Sensing of Mines, Explosive Objects, and Obscured Targets XII, ed. R.S. Harmon et al., Proc. SPIE vol. 6953 (2008), pp. 695304-1-694304-11 (11 pages total).

W.R. Scott, Jr. et al. "Broadband Array of Electromagnetic Induction Sensors for Detecting Buried Landmines," Geoscience and Remote Sensing Symposium, 2008. IGARSS 2008, pp. 11-375-11-378 (4 pages total).

AC. Gurbuz et al. "Location Estimation Using a Broadband Electromagnetic Induction Array," Detection and Sensing of Mines, Explosive Objects, and Obscured Targets XIV, ed. R.S. Harmon et al., Proc. SPIE vol. 7303 (2009), pp. 73030U-1-73030U-9 (9 pages total).

Mark P. Kolba et al., "A Framework for Information-Based Sensor Management for the Detection of Static Targets," IEEE Transactions on Systems, Man, and Cybernetics, Part A: Systems and Humans, vol. 41, No. 1, Jan. 1, 2011 (16 pages total).

International Search Report and Written Opinion for related International Appl. PCT/US2013/063218, dated Jun. 16, 2014 (16 pages total).

Examination Report issued in an Indian Counterpart Application No. 1045/MUMNP/2015, dated May 27, 2019, 8 pages.

* cited by examiner

SHIELDINGS FOR METAL DETECTOR HEADS AND MANUFACTURING METHODS THEREOF

This application is a division of U.S. patent application Ser. No. 14/045,136, filed Oct. 3, 2013, entitled "Shieldings for Metal Detector Heads and Manufacturing Methods Thereof," which claims the benefit of priority from U.S. Provisional Patent Application No. 61/709,936, filed Oct. 4, 2012, both of which are incorporated herein by reference in their entirety.

FIELD

The present disclosure is directed to the field of mine and metal detection and, more particularly, towards systems and methods for shielding a metal detector head.

BACKGROUND

In the field of mine and metal detection, a detector can be sensitive to changes in capacitive coupling between coils in the detector and the environment.

SUMMARY

In one aspect, a metal detector head consistent with the disclosure can include a transmit-receive coil assembly and shielding positioned between the transmit-receive coil assembly and an external environment. In an aspect, the transmit-receive coil assembly can include at least one receive coil and at least one transmit coil, the transmit coil positioned in spaced relation with the receive coil. Further, in an aspect the shielding can be configured to be flexible, conductive, and non-magnetic, where the shielding is configured to stabilize capacitance between the shielding and the at least one receive coil and the at least one transmit coil. Furthermore, the shielding can be configured to reduce effect on the metal detector head from changing capacitance caused by objects in the external environment.

In another aspect, a metal detector head consistent with the disclosure can include a transmit-receive coil assembly, and shielding including at least one wiring pattern formed on at least one printed circuit board. In an aspect, the transmit-receive coil assembly can include at least one receive coil and at least one transmit coil, the transmit coil positioned in spaced relation with the receive coil. Further, in an aspect, the shielding can be positioned between the transmit-receive coil assembly and an external environment, where the shielding is configured to stabilize capacitance between the shielding and the at least one receive coil and the at least one transmit coil. Furthermore, the shielding can be configured to reduce effect on the metal detector head from changing capacitance caused by objects in the external environment.

In another aspect, a method for manufacturing a shielded metal detector head consistent with the disclosure can include assembling a metal detector head including a housing having a transmit-receive coil assembly, the transmit-receive coil assembly including at least one receive coil and at least one transmit coil, the transmit coil positioned in spaced relation with the receive coil, and placing shielding between the transmit-receive coil assembly and an external environment to stabilize capacitance between the shielding and the at least one receive coil and at least one transmit coil. In an aspect, the shielding can be configured to be flexible, conductive, and non-magnetic, and can further be configured to reduce effect on the metal detector head from changing capacitance caused by objects in the external environment.

In an additional aspect, a method for manufacturing a shielded metal detector head consistent with the disclosure can include assembling a metal detector head including a housing having a transmit-receive coil assembly, the transmit-receive coil assembly including at least one receive coil and at least one transmit coil, the transmit coil positioned in spaced relation with the receive coil, and placing shielding between the transmit-receive coil assembly and an external environment. In an aspect, the shielding can include wiring patterns formed on at least one printed circuit board, where the shielding is fixed between the transmit-receive coil assembly and the external environment to stabilize capacitance between the shielding and the at least one receive coil and at least one transmit coil. Furthermore, in an aspect, the shielding can be configured to reduce effect on the metal detector head from changing capacitance caused by objects in the external environment.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to the present embodiments (exemplary embodiments) consistent with the disclosure, examples of which are illustrated in the accompanying drawings. Wherever possible, the same reference numbers will be used throughout the drawings to refer to the same or like parts.

Figure 1:
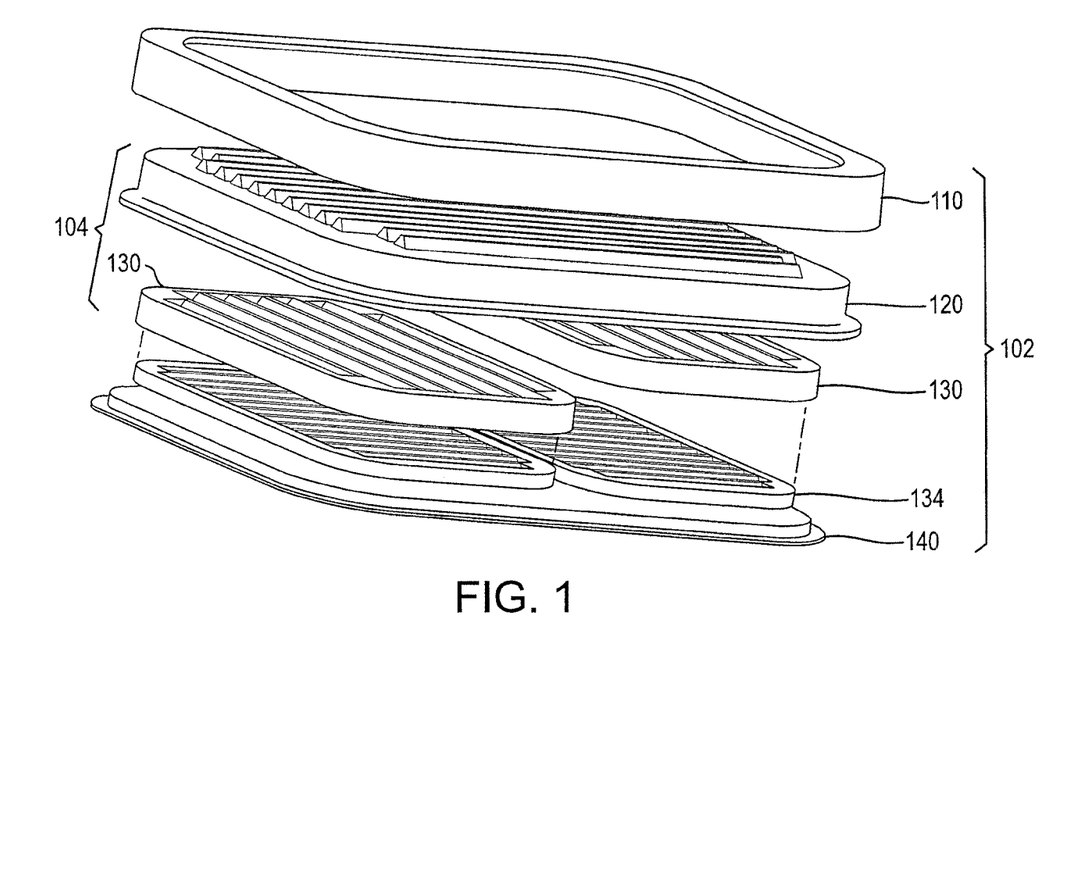
FIG. 1 is a schematic representation of an exploded perspective view of a metal detector head according to a disclosed implementation.

Embodiments of exemplary metal detection ("MD") heads will now be discussed with reference to FIGS. 1-8. FIG. 1 illustrates a schematic representation of an exploded perspective view of a metal detector head 102 according to a disclosed implementation. The metal detector head 102 can include a top cover 110, a bottom cover 140, and a transmit-receive coil assembly 104. The coil assembly can be formed of a first transmit coil form 120 and one or more receive coil forms 130 (two are shown in the drawings), which can also include receive coil faun stiffeners 134 inserted within the receive coil forms 130 to provide a more rigid structure. The coil forms are shown in FIG. 1 as being substantially box-shaped (square or rectangular), though they may be "D"-shaped, or take other forms known to those of skill in the art. The exemplary receive coil assembly is shown formed as two box-shaped halves. The receive coil can extend around the inside or the outside of the outer circumference of both of the receive coil forms 130. The receive coil can be arranged such that current in the receive coil flows in a figure eight pattern through multiple turns of the receive coil, with current flowing through the portions of the coil between the receive coil forms 130 in the same direction. The transmit coil can extend around the outer circumference of both of the receive coil forms 130 on the outside or inside of the transmit coil form 120. The coil forms and wiring can be as thin as possible consistent with structural and electrical requirements in order to minimize weight and extraneous electromagnetic effects.

With the exception of the coils and other electrical/working components, the structural components of the head 102 can be formed of any suitable materials that provide thermal and mechanical stability. For example, the structural components can be formed of fiberglass, plastics including thermoplastics such as polyvinyl chloride (PVC), ABS plastic, etc., and other known materials.

Figure 2:
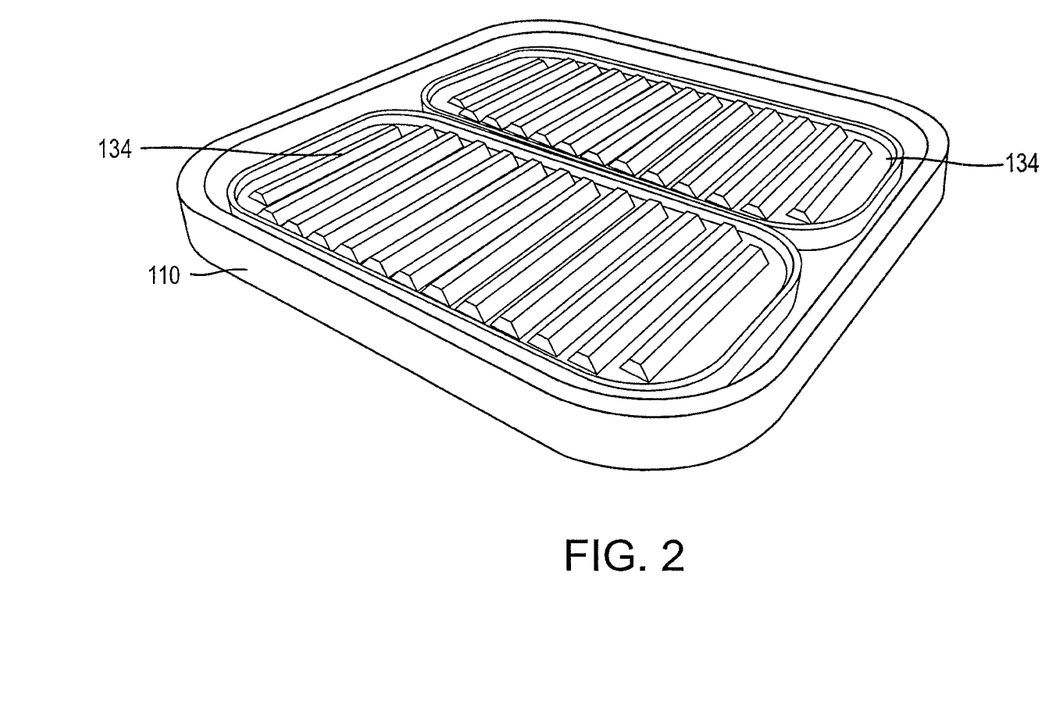
FIG. 2 is a schematic representation of a bottom perspective view of a metal detector head, with bottom cover removed, according to a disclosed implementation.

Referring now to FIG. 2, a schematic representation of a bottom perspective view of a metal detector head according to a disclosed implementation is shown. Illustrated is a bottom view down into the top cover 110 of the assembly or housing 102, with the bottom cover removed. According to the exemplary implementation of FIG. 2, two receive coil form stiffeners 134, and the corresponding receive coil forms, can be used, though those of skill in the art will recognize that more or less such elements can be used. Receive coil form stiffeners and corresponding forms can include a cavity (shown here on the bottom) or otherwise be hollow to provide for a lightweight head assembly. As set forth above, the receive coil form stiffeners 134 can be inserted within the receive coil forms 130 to provide a more rigid structure. The receive coil forms 130 and the receive coil form stiffeners 134 can be formed of any suitable materials that support the coils, provide rigidity/mechanical stability, and enable the inductance to be maintained constant or fixed. These elements can be made of any non-magnetic and non-conductive materials, as set forth elsewhere herein.

Figure 3:
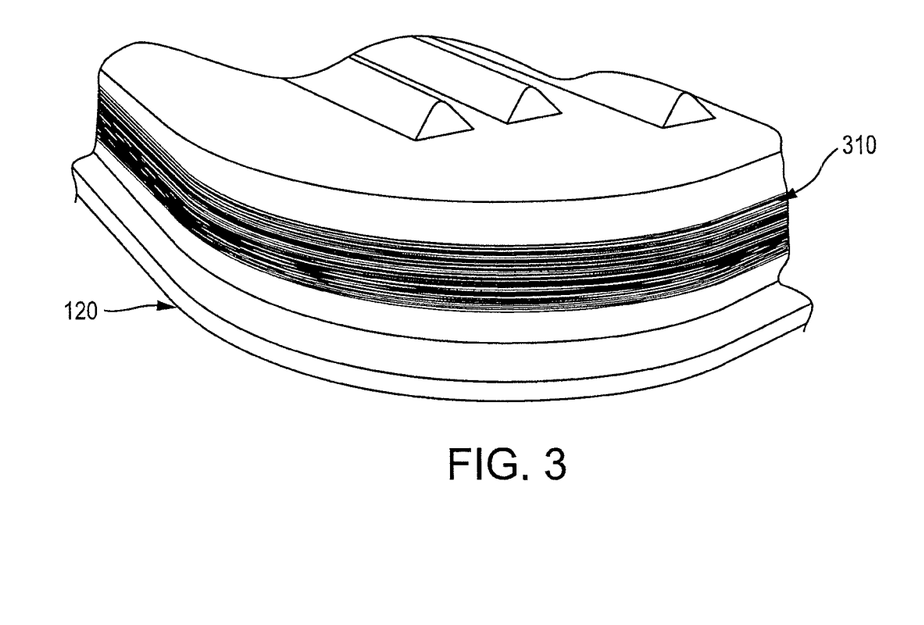
FIG. 3 is a schematic representation of a side perspective view of a transmit coil form including coil wire wrapped around the form according to a disclosed implementation.

FIG. 3 is a schematic representation of a side perspective view of a transmit coil form 120 including wire 310 wrapped around the form according to a disclosed implementation. A bonding agent such as glue can be employed to bond wire 310 to transmit coil form 120. The wires or traces 310 can be formed of conductive, metallic material such as copper in accordance with existing technology. If the wiring is to be achieved by patterning, known technologies such as chemical etching can be used.

Figure 4:
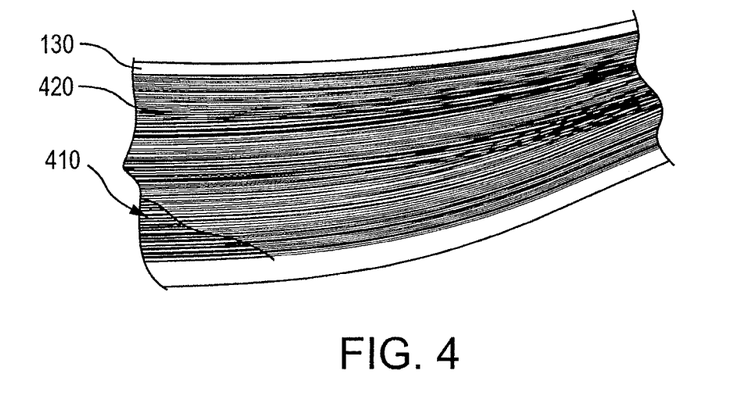
FIG. 4 is a schematic representation of a side elevational view of a receive coil form including coil wire wrapped around the form and glued to produce the coil according to a disclosed implementation.

FIG. 4 is a schematic representation of a side elevation view of a receive coil faun 130 including wire 410 wrapped around the form 130 and which can be bonded with a bonding agent 420 such as glue to produce the coil according to a disclosed implementation. In the disclosed implementation, two such receive coils can be used in the MD head, providing a receive coil assembly formed from two box- or D-shaped halves. Connectors (not shown) can connect the wires or traces on the two receive coils such that an induced current flows in opposite directions in the two coils. Alternatively, the receive coil can be wrapped in a figure eight pattern through multiple turns of the coil assembly around the two receive coil forms 130. Both of these arrangements are referred to in the art as quadrupole configurations. The wires or traces 410 can be formed of conducting, metallic material such as copper, in accordance with existing technology. If the wiring is to be achieved by patterning, known techniques such as chemical etching may be used.

Additional implementations of transmit and receive coil structures can be used, including but not limited to receive quadrupole coil(s) made using multilayer printed circuit board technology inside a transmit dipole coil constructed of wire wound or wrapped on a rigid form. In general, other coil configurations, such as two or more receive quadrupole coils inside a single transmit dipole coil, are all examples within the scope of the present disclosure, each exhibiting advantages and disadvantages for application in specified circumstances. In one alternative implementation, for example, the transmit coil can be formed in a simple box-shaped, circular, or other pattern on a separate substrate surrounding a single receive coil such that the receive coil is aligned with an axis of symmetry of the transmit coil.

In implementations discussed herein, the receive coil can be in a quadrupole configuration, with the transmit coil in a dipole configuration. Further details of the designs and implementations of a MD sensor in a quadrupole configuration are discussed in at least the following papers, all of which are hereby incorporated by reference in their entirety in this application: "Broadband Electromagnetic Induction Sensor for Detecting Buried Landmine," Waymond R. Scott, Jr.; "New Cancellation Technique for Electromagnetic Induction Sensors," Waymond R. Scott, Jr., and Michael Malluck; "Broadband Array of Electromagnetic Induction Sensors for Detecting Buried Landmines," Waymond R. Scott, Jr.; "Location Estimation Using A Broadband Electromagnetic Induction Array," Ali C. Gurbuz, Waymond R. Scott, Jr., and James H. McClellan; "Beamforming Array for Detecting Buried Land Mines," Seung-Ho Lee and Waymond R. Scott, Jr.; "Combined Seismic, Radar, and Induction Sensor for Landmine Detection," Waymond R. Scott, Jr.; Kangwook Kim, Gregg D. Larson, Ali C. Gurbuz, and James H. McClellan; and "Performance Comparison of Frequency Domain Quadrupole and Dipole Electromagnetic Induction Sensors in a Landmine Detection Application," Eric B. Fails, Peter A. Torrione. Waymond R. Scott, Jr., and Leslie M. Collins.

Figure 5A:
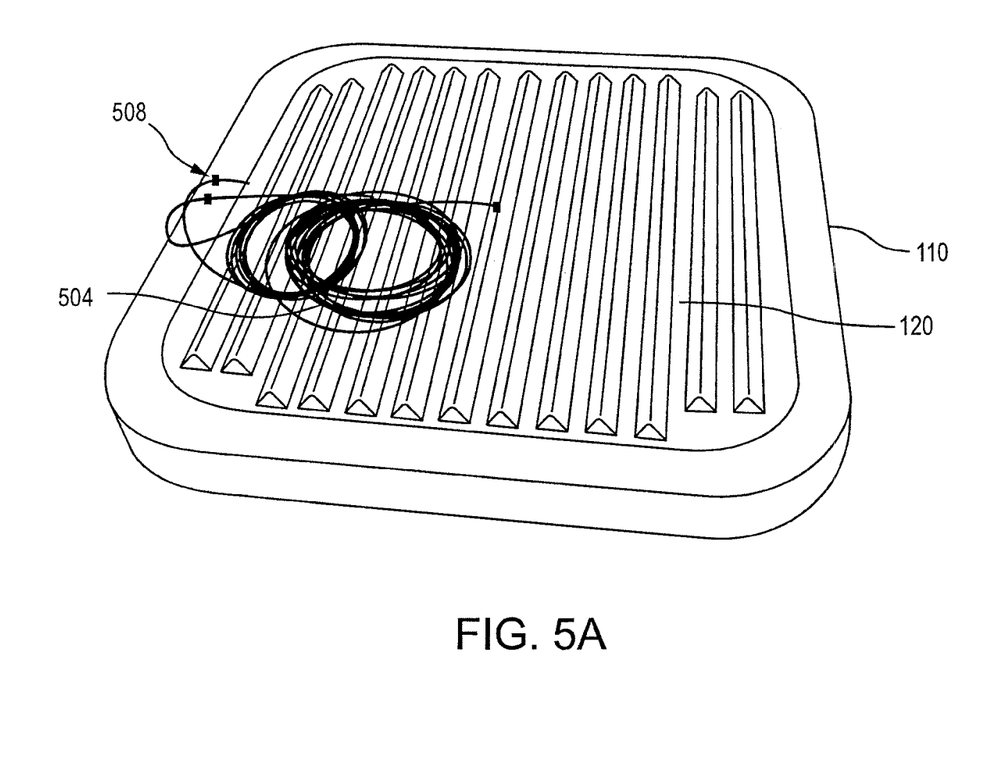
FIGS. 5A and 5B are a top perspective view, and a close-up perspective view, respectively, of an assembled metal detector head according to a disclosed implementation.
Figure 5B:
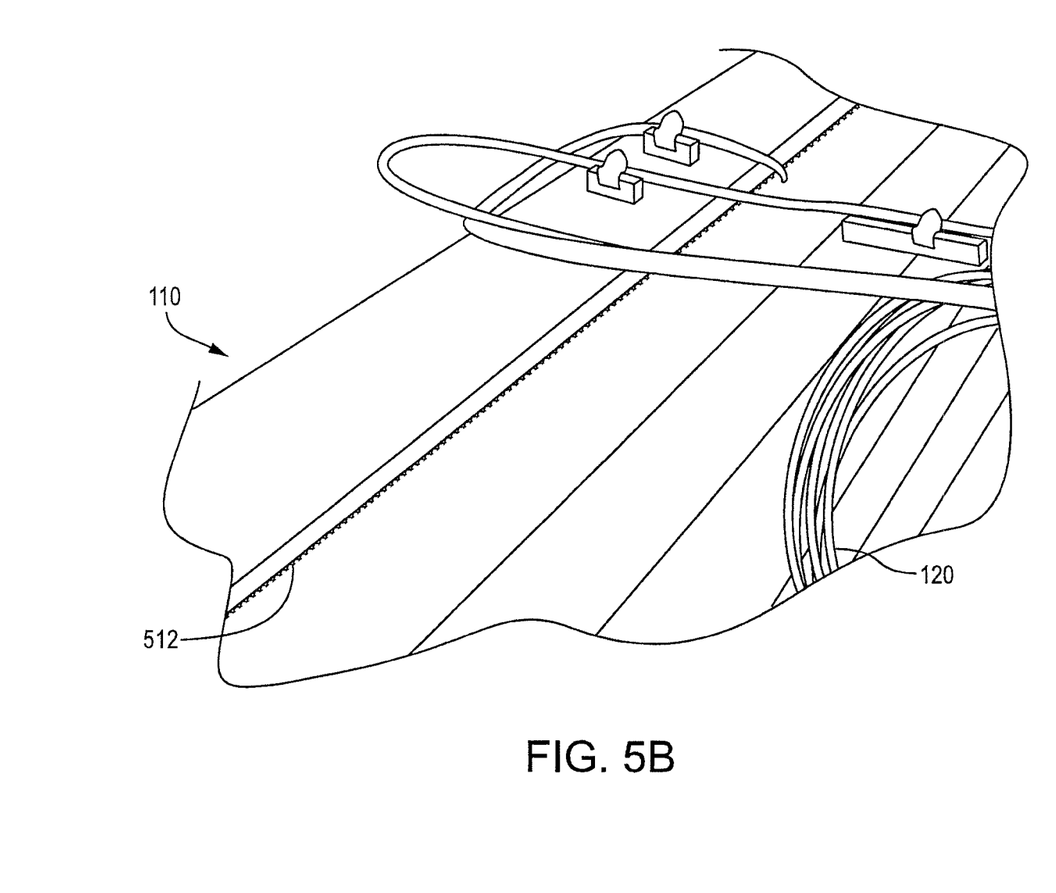

FIGS. 5A and 5B are a top perspective view, and a close up perspective view, respectively, of an assembled metal detector head according to a disclosed implementation. Referring to FIGS. 5A and 5B, a head assembly is shown, illustrating a top cover 110, the top of the transmit coil form 120, as well as external wiring components 504 to electrically connect the MD head to metal detecting circuitry and/or processing components. Such wiring components 504 are, in turn, coupled to the head assembly at coupling points 508, which can be external/visible connections, as shown, or formed in-line with the various MD head elements. Regardless of the various head or housing structure(s) employed, the transmit and receive coils of the head will be electrically and/or mechanically connected, either directly to each other or to another component or the housing, e.g., via the electrical connections 504/508, mechanical connections (not shown), etc.

The assembled metal detector head can also include non-magnetic shielding positioned between the transmit/receive coils and the external environment to stabilize and provide a fixed capacitance between the shielding and the coils, such that changes in capacitance caused by objects in the surrounding environment are reduced.

The close up view of FIG. 5B also illustrates and assembled MD head with a top cover 110 having shielding 512 applied to an inner surface of the top cover 110. Therefore, only an edge of shielding 512 can be seen in FIG. 5B.

Figure 6:
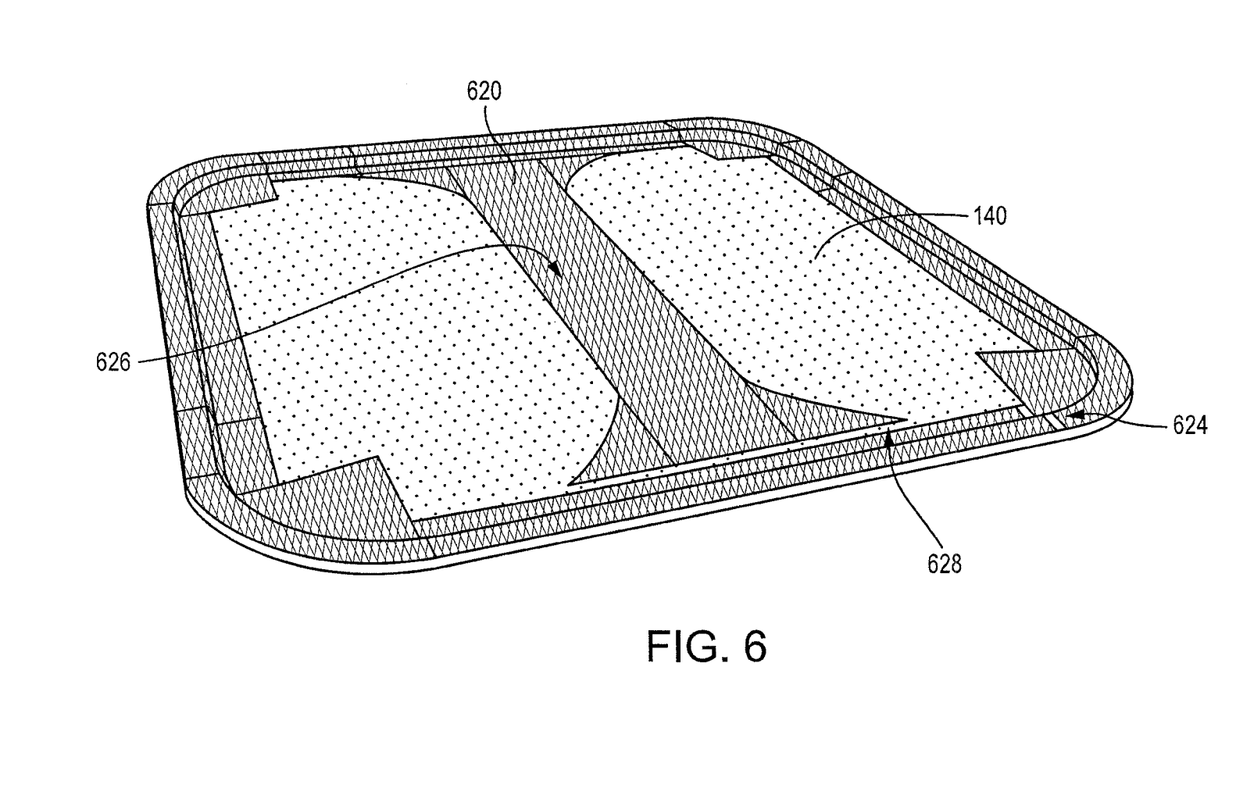
FIG. 6 is a schematic representation illustrating mesh shielding on the bottom side of a bottom cover of a metal detector head according to a disclosed implementation.

FIG. 6 is a perspective view showing mesh shielding on the bottom side of a bottom cover 140 of a metal detector head according to a disclosed implementation. Referring to FIG. 6, shielding 620 on the bottom side of the bottom cover 140 of a MD head is shown. In general, the shielding 512 and 620 comprise a non-magnetic metal. The shielding can also be fabricated and/or configured in such a way to reduce eddy and loop currents, which generate magnetic fields opposing and therefore reducing the desired field. In one implementation, discussed throughout this disclosure, such shielding may be a woven metal mesh, such as screen materials, formed of non-magnetic metal, such as copper or brass. The shielding can also comprises other nonmagnetic metal materials, such as metal films deposited on flexible substrates, metal wiring patterns formed on thin substrates such as printed circuit boards, or other thin film materials known in the art, some of which are discussed elsewhere herein. For shielding comprised of metal film deposited on substrates, such substrates can be flexible substrates such as polyester or polyimide. For shielding comprised of wiring patterns, the wiring can be formed/etched/fabricated in manners consistent with existing printed circuit board (PCB) construction. All such metal films would be some non-magnetic metal, such as aluminum or copper. Further, such metal screens or films can be fabricated or placed to prevent current loops from forming in the shielding. For example, for shielding comprised of metal mesh or screen, the shielding can be configured with one or more gaps to prevent such loop or eddy currents from forming within the mesh. In one exemplary implementation, such gaps may be between about 1/16 to about 1/4 inch wide, about 1/8 inch wide, or of other width determined as small as practical, with no conduction occurring across the gap, but not so large the capacitance stabilizing goal is not met. In the implementation shown in FIG. 6, for example, gaps 628 in the shielding on the bottom cover can be located on one edge of the bottom cover where a central strip 626 abuts the strip that encircles the outer periphery of the bottom cover, and another gap 624 may be located at or near corners of the bottom cover, between the strips running along the outer periphery and regions of shielding located at the corners. The gaps can be located in such a way that all areas of the shield are connected electrically to all other areas, but without introducing any closed loops. The complete, flexible shielded structure 512 and 620 can be made physically stable with stable internal capacitance, by embedding the flexible shield 512 and 620 in a glue, resin or other bonding material. For example, the glue, resin or bonding material can bond the shield to the coils and structure. When it hardens or cures, the final structure can be physically stable. In some exemplary implementations, the bonding material can be a resin, such as a thermoset plastic, a thermoplastic softened sufficiently with solvent, etc.

Figure 7:
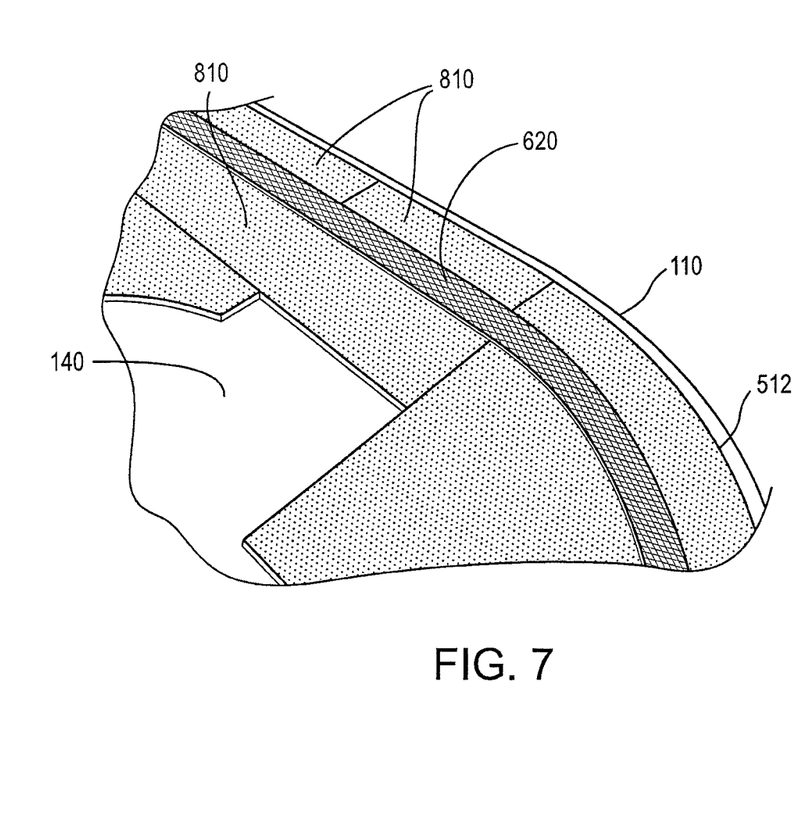
FIG. 7 is a schematic representation of a view of an assembled metal detector head from the bottom with shielding that is substantially covered by planar elements according to a disclosed implementation.

FIG. 7 is a schematic representation of an assembled metal detector head from the bottom with shielding that is substantially covered by planar elements according to a disclosed implementation. FIG. 7 illustrates, for example, an assembled MD head showing the shielded bottom cover 140 shown in FIG. 6 wherein the shielding 620 has been bonded to the bottom cover 140 and further with planar protective elements 810 bonded over the top of most of the shielding 620. An outside, bottom edge of the top cover 110 is shown extended down around the edges of the assemble MD head. Additionally, a portion of exposed shielding 512 can be seen sandwiched between the edge of the top cover 110 and the abutting portion of the bottom cover.

Figure 8:
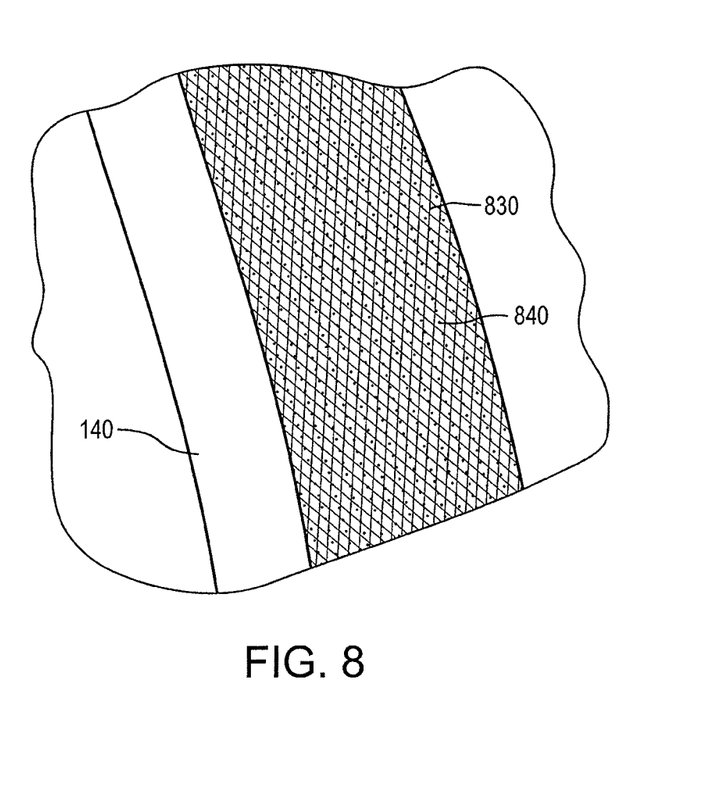
FIG. 8 is a schematic representation of a close up view of the bottom cover shown in FIG. 7, showing an exposed portion of mesh shielding and bonding material, according to a disclosed implementation.

FIG. 8 is a schematic representation of a close up view of the bottom cover 140 shown in FIG. 7, showing an exposed portion 830 of mesh shielding 620 and bonding material 840, according to a disclosed implementation. Here, the exposed portion 830 is shown embedded in a glue, resin or other bonding material 840. The same approach can be employed for shielding 512. In other implementations, the shielding 512 and/or 620 can be bonded to surfaces of the apparatus to which it is applied using a solvent that at least partially dissolves an outer layer of the surfaces to embed the shielding in a unitary structural relationship with the surfaces of the apparatus as the solvent evaporates. Additionally, the shielding 512 and/or 620 can be perforated such that resin etc. used to bond the shielding to the apparatus structure may flow through and around the shielding to improve adhesion between the resin, apparatus and shielding. Here, for example, in implementations where non-metal portions of the apparatus are constructed of fiberglass, the shielding can be bonded to the fiberglass via a resin that is an epoxy compatible with the fiberglass' structural resin. In like manner, in implementations where non-metal portions of the apparatus are formed of a thermoplastic material, the shielding can be bonded to the thermoplastic via a resin that is a thermoplastic resin compatible with the thermoplastic material. Here, for example, the thermoplastic material can be or can include acrylic-butadiene-styrene (ABS) plastic or polyvinyl chloride (PVC) and the resin can be acrylic-butadiene-styrene (ABS). Further, the PVC material and the ABS resin may be solvent-welded together with chloromethane or a hydrofuran. Implementations include ABS thermoplastic softened with solvent, allowing the metal shield to be embedded within. When the solvent evaporates, the shield can be securely held in place by the rigid ABS plastic. Such innovations provide devices of critical lightweight nature, with unexpectedly good capacitance characteristics. Finally, a layer of planar elements can also be applied over areas of the shielding while the resin/solvent is active, wherein the planar elements are formed of a material reactive to the resin/solvent such that at least an outer layer of the planar elements dissolves and the planar elements solidify into unitary structural relation with the shielding.

A method for manufacturing a shielded metal detector head can comprise placing non-magnetic shielding on at least one cover or housing associated with the head, in strips positioned to lie adjacent to wiring of one or more coils, bonding the shielding to the cover using a resin that, upon curing, secures the shielding together with the at least one cover, and assembling the head elements within the housing. In one implementation, assembly of the head elements can include: positioning one or more receive coil forms, upon which receive coil wiring is wound, on top of the bottom cover, with the receive coil wiring being aligned directly above the strips of shielding on the bottom cover; positioning a transmit coil form, upon which transmit coil wiring is wound, on top of the one or more receive coil forms; and securing the receive coils forms and the transmit coil form, which can be made of non-magnetic, non-conductive materials, within the housing; wherein the transmit coil is positioned in spaced relation with respect to the receive coils and the shielding is configured/positioned to provide a fixed capacitance between the shielding and the coils, such that the metal detector head is insulated from changes in capacitance caused by objects in the surrounding environment.

Figure 9:
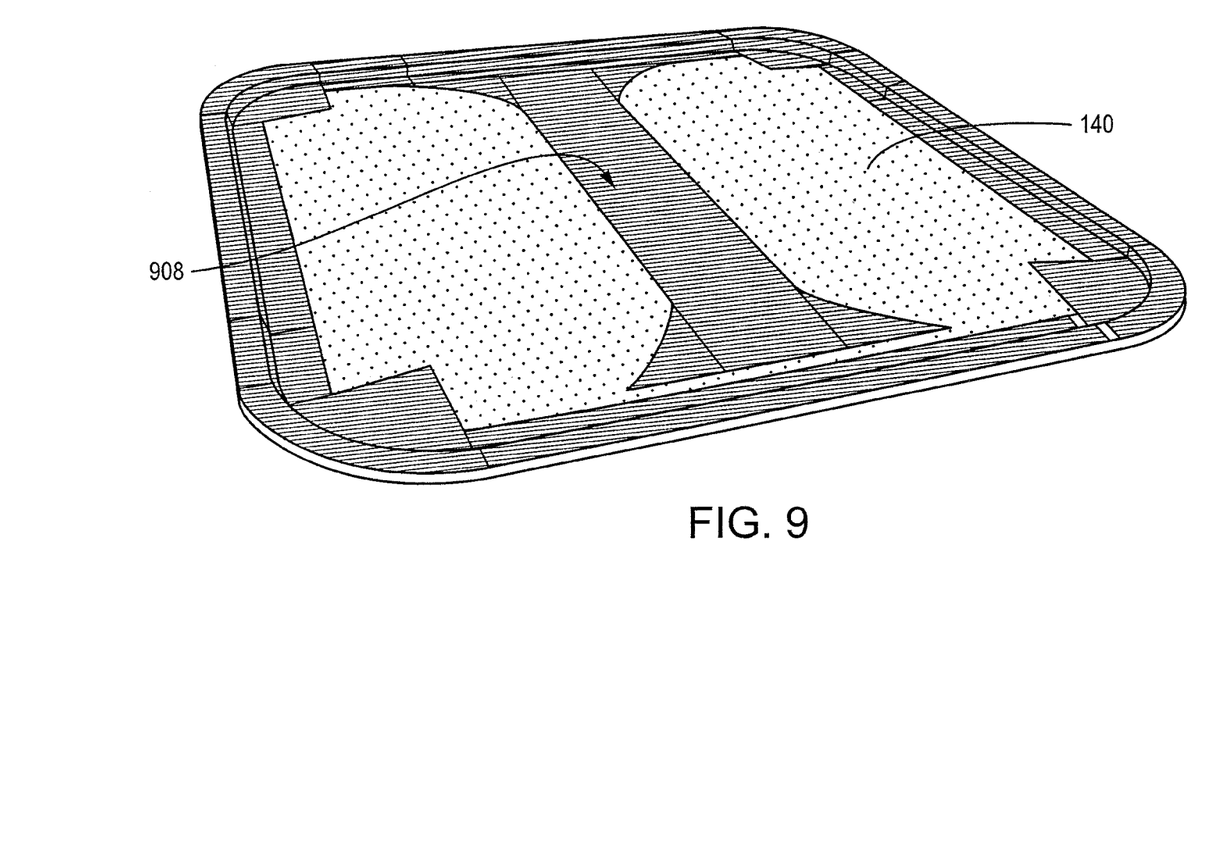
FIG. 9 is a schematic representation illustrating shielding comprised of printed wiring patterns on a bottom cover of a metal detector head according to a disclosed implementation.

FIG. 9 is a schematic representation illustrating shielding comprised of printed wiring patterns on a bottom cover of a metal detector head according to a disclosed implementation. FIG. 9 illustrates a bottom cover 140 with regions of shielding thereon similar to FIG. 6, wherein the shielding is comprised of metal wiring patterns 908 formed on thin substrates such as printed circuit boards, metal films deposited on flexible substrates, or other thin film materials known in the art. When the shielding comprises metal film deposited on substrates, such substrates can be flexible substrates such as polyester or polyimide. For shielding comprised of wiring patterns, the wiring can be formed/etched/fabricated in manners consistent with existing printed circuit board (PCB) construction. The wiring patterns can include fingers and/or interdigitated traces. Further, such wiring patterns can be placed in a geometric arrangement configured to provide a fixed electric field (capacitance) between the coils and the shielding. As such, the wiring patterns can electromagnetically shield the electric fields associated with the coils from undesired capacitive effects caused by external conductive objects. Such metal traces or films can also be fabricated or placed to prevent current loops from forming in the shielding, which would generate opposing magnetic fields, reducing the desired field. Here, for example, circuit wiring can be printed in geometric arrangement wherein no current eddies/loops will form. A similar shielding structure may be applied to the inside of the top cover 110 adjacent transmit coil 310.

Figure 10:
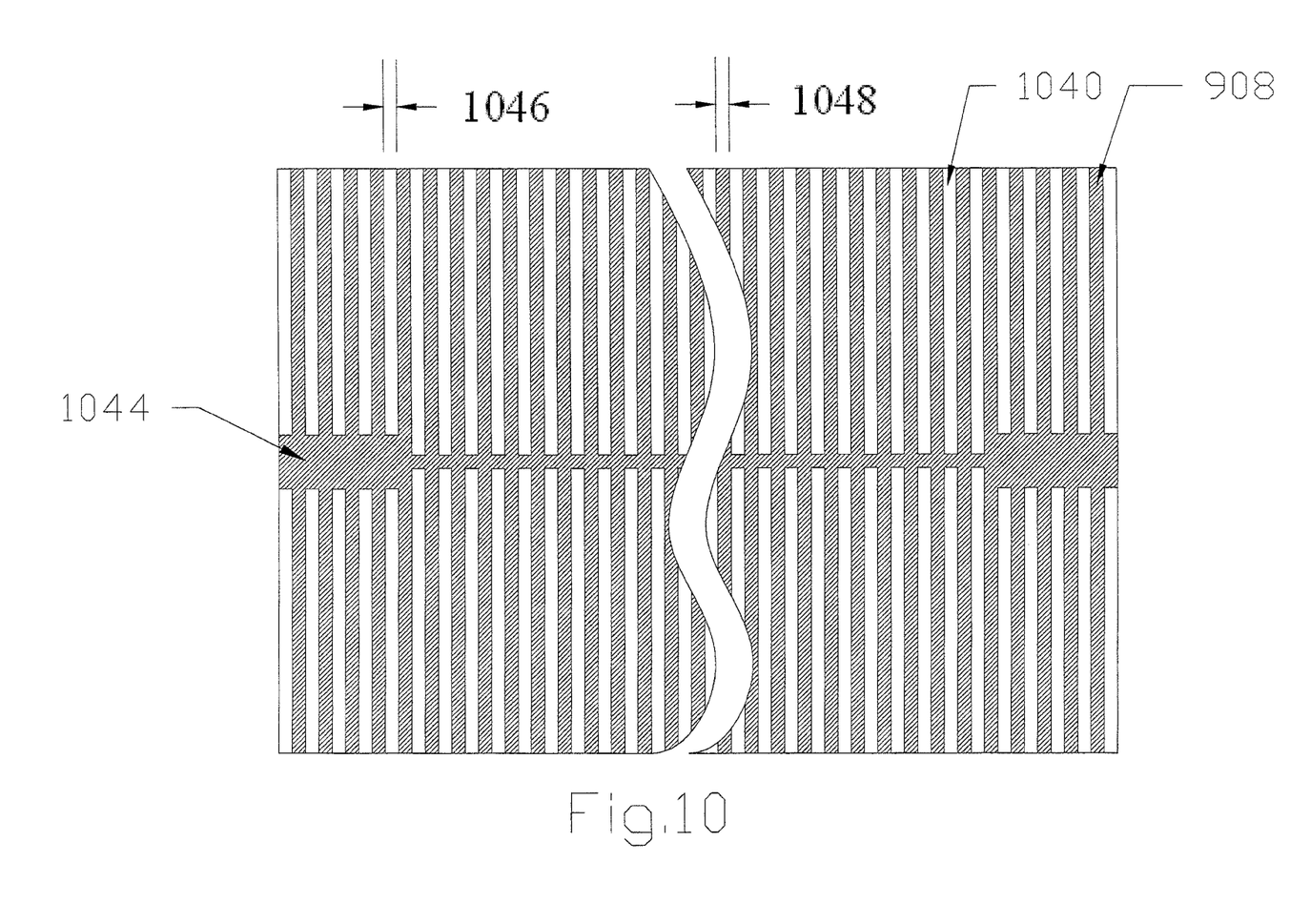
FIG. 10 is a schematic representation of exemplary wiring patterns of shielding comprised of printed wiring according to a disclosed implementation.

FIG. 10 is a schematic representation of wiring patterns of shielding comprised of printed wiring 908 according to a disclosed implementation. Referring to FIG. 10, shielding including wiring and/or areas of conductive traces 908 can be placed around the coils to achieve the capacitive benefits consistent with aspects of the innovations herein. This shielding can include regions of parallel wiring or traces 908 and open or gap regions 1040, that work together to set a constant or fixed capacitance between the shielding and the coils, such that changes in capacitance caused by objects in the surrounding environment are reduced. End areas 1044 are for the convenience of electrically connecting adjacent tiles together, such as with solder and connectors (e.g., jumper wires, etc.).

In some embodiments, to minimize eddy current formation, the parallel traces 908 can be fabricated having widths 1048 as narrow as possible for the materials used. To minimize the effects of objects in the surrounding environment, the spacing 1046 between the traces 1040 can also be fabricated with widths that are as small as possible for the materials used. By way of example, trace and space size may be 0.015 inch for certain embodiments, and current PCB technology may allow the trace and space size to be as small as 0.01 inch (0.254 mm) for an appropriate copper foil thickness. In some implementations, such spacing may be in the range of 0.005-0.015 inches, 0.01-0.02 inches, 0.005-0.025 inches, or in ranges of about such values. Additionally, to be flexible enough to conform to any unevenness of the MD and to ensure good adhesion of the bonding glue, the PCB substrate may also be formed as a thin layer. Here, e.g., for typical fiberglass substrate materials, such thicknesses may be about 0.01-0.1 inch or about 0.01-0.04 inch, with one illustrative thickness being on the order of 0.02 inch (0.508 mm). Furthermore, trace/space patterns may be printed in a variety of other patterns beyond the simple set of straight, orthogonal parallel lines shown by way of illustration in FIG. 10. As such, devices herein may be implemented using other patterns, as long as there are no loops. For example, patterns of straight lines like branches of a tree may be used, or the branches may be patterns of parallel curved lines.

Figure 11:
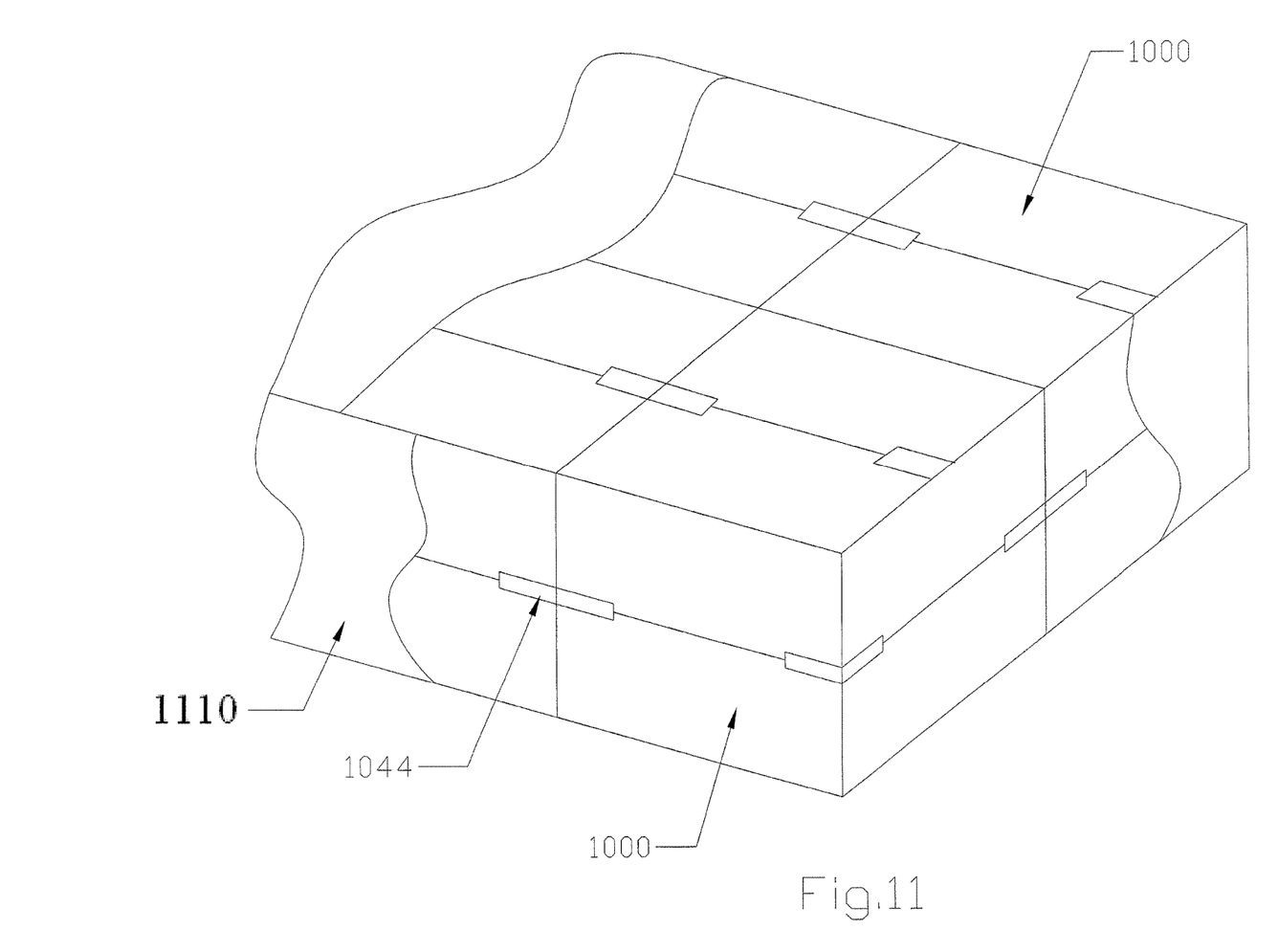
FIG. 11 is a schematic representation illustrating shielding on a rectangular cuboid metal detector head according to a disclosed implementation.

FIG. 11 is a schematic representation illustrating shielding on a rectangular cuboid metal detector head according to a disclosed implementation. In contrast, FIGS. 1-9 show aspects of illustrative devices having complex, curved shapes. However, if the outer head structure is more straightforward, e.g. a simple rectangular cuboid shape, simple tiles such as flat rectangular tiles can be used to cover the structure and form the shield. One such representative head structure 1110 is shown in FIG. 11 by way of illustration. Here, for example, these tiles can be one-sided PCBs constructed consistent with the disclosure of FIG. 10, above. Referring to FIG. 11, a metal detector head element 1110 is shown, in which such tiles 1000 can be applied and electrically coupled via end areas 1044.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:
1. A metal detector head comprising:
   a transmit-receive coil assembly;
   shielding comprising at least one wiring pattern formed on at least one printed circuit board; and
   a layer of planar elements covering at least one area of the shielding and forming a unitary structural relation with the at least one area of the shielding;
   wherein the transmit-receive coil assembly comprises at least one receive coil and at least one transmit coil, the transmit coil positioned in spaced relation with the receive coil;
   wherein the shielding is positioned between the transmit-receive coil assembly and an external environment;

wherein the shielding is configured to stabilize capacitance between the shielding and the at least one receive coil and the at least one transmit coil; and wherein the shielding is configured to reduce effect on the metal detector head from changing capacitance caused by objects in the external environment.

2. The apparatus of claim 1 wherein the at least one wiring pattern comprises at least one of: fingers and interdigitated traces.

3. The apparatus of claim 1 wherein the at least one wiring pattern is placed in a geometric arrangement, the geometric arrangement configured to provide a fixed electric field between the at least one wiring pattern and the at least one receive coil and the at least one transmit coil.

4. The apparatus of claim 1 wherein the at least one wiring pattern is placed in a geometric arrangement wherein no current eddies and no current loops form in the shielding.

5. The apparatus of claim 1 wherein the wiring pattern includes tracings with spacing therebetween, wherein a width size of at least one of the tracings and the spacing therebetween is one of: between about 0.005 inch and 0.015 inch, between about 0.01 inch and 0.02 inch, between about 0.005 inch and 0.025 inch, about 0.01 inch, and about 0.015 inch.

6. The apparatus of claim 1 wherein the printed circuit board has a thickness, the thickness being one of: between about 0.01 inch and 0.1 inch, between about 0.01 inch and 0.04 inch, and about 0.02 inch.

7. The apparatus of claim 1 wherein the wiring pattern is arranged in parallel curved lines.

8. A method for manufacturing a shielded metal detector head, the method comprising:

assembling a metal detector head including a housing having a transmit-receive coil assembly, the transmit-receive coil assembly comprising at least one receive coil and at least one transmit coil, the transmit coil positioned in spaced relation with the receive coil;

placing shielding between the transmit-receive coil assembly and an external environment; and forming a unitary structure including a layer of planar elements and at least one area of the shielding;

wherein the shielding comprises wiring patterns formed on at least one printed circuit board;

wherein the shielding is fixed between the transmit-receive coil assembly and the external environment to stabilize capacitance between the shielding and the at least one receive coil and at least one transmit coil;

wherein the shielding is configured to reduce effect on the metal detector head from changing capacitance caused by objects in the external environment.

9. The method of claim 8 wherein the at least one wiring pattern comprises at least one of the set of: fingers and interdigitated traces.

10. The method of claim 8 wherein the at least one wiring pattern is placed in a geometric arrangement, the geometric arrangement configured to provide a fixed electric field between the at least one wiring pattern and the at least one receive coil and the at least one transmit coil.

11. The method of claim 8 wherein the at least one wiring pattern is placed in a geometric arrangement wherein no current eddies and no current loops form in the shielding.

12. The method of claim 8 wherein the wiring pattern includes tracings with spacing therebetween, wherein a width size of at least one of the tracings and the spacing therebetween is one of: between about 0.005 inch and 0.015 inch, between about 0.01 inch and 0.02 inch, between about 0.005 inch and 0.025 inch, about 0.01 inch, and about 0.015 inch.

13. The method of claim 8 wherein the printed circuit board has a thickness, the thickness being one of: between about 0.01 inch and 0.1 inch, between about 0.01 inch and 0.04 inch, and about 0.02 inch.

14. The method of claim 8 wherein the wiring pattern is arranged in parallel curved lines.

* * * * *